United States Patent
Lee et al.

(10) Patent No.: US 8,714,507 B1
(45) Date of Patent: May 6, 2014

(54) CONVERTIBLE TRIVET

(71) Applicant: Robinson Home Products Inc., Williamsville, NY (US)

(72) Inventors: Stuart Harvey Lee, Forest Hills, NY (US); Jenna Marie Edgemon, Brooklyn, NY (US); Phornpavee Saiyavath, Pittsburgh, PA (US)

(73) Assignee: Robinson Home Products Inc., Williamsville, NY (US)

( * ) Notice: Subject to any disclaimer, the term of this patent is extended or adjusted under 35 U.S.C. 154(b) by 0 days.

(21) Appl. No.: 13/783,200

(22) Filed: Mar. 1, 2013

(51) Int. Cl.
*A47B 91/00* (2006.01)

(52) U.S. Cl.
USPC .................. 248/346.01; 248/152; 248/176.2

(58) Field of Classification Search
USPC ............... 248/346.01, 346.03, 117.2, 117.3, 248/176.1, 176.2, 152; D7/388; 220/743
See application file for complete search history.

(56) References Cited

U.S. PATENT DOCUMENTS

| | | | |
|---|---|---|---|
| 3,967,803 A | | 7/1976 | Kienlen et al. |
| 4,725,028 A | | 2/1988 | Conradt |
| D388,278 S | | 12/1997 | Howitt |
| 6,000,666 A | | 12/1999 | Kari |
| 6,056,256 A | * | 5/2000 | Ponce ....................... 248/346.01 |
| 7,048,243 B1 | * | 5/2006 | Steinman ................. 248/346.01 |
| D694,061 S | * | 11/2013 | Lee et al. ........................ D7/388 |
| D696,064 S | * | 12/2013 | Hwang .......................... D7/388 |
| 2005/0151044 A1 | * | 7/2005 | Settele ..................... 248/346.01 |
| 2007/0034755 A1 | | 2/2007 | Duke |
| 2009/0280295 A1 | * | 11/2009 | Prince et al. .................. 428/139 |
| 2010/0183814 A1 | * | 7/2010 | Rios et al. ..................... 427/387 |

FOREIGN PATENT DOCUMENTS

CA   WO2013082723   * 12/2012 .............. A47J 36/34

* cited by examiner

*Primary Examiner* — Gwendolyn W Baxter
(74) *Attorney, Agent, or Firm* — Florek & Endres PLLC

(57) ABSTRACT

A trivet having three or more lobes connected serially to one another by elastomeric connectors, such that each lobe is coupled to an adjacent lobe on each side to form a continuous loop of the three or more lobes, where the trivet can be converted from a closed configuration with the lobes directed inwardly to an open configuration, with the lobes directed outwardly, by rotating the lobes 180° on the connectors.

13 Claims, 4 Drawing Sheets

CONVERTIBLE TRIVET

FIELD OF THE INVENTION

The present invention relates to household items and, more particularly, to a trivet that is designed to protect surfaces upon which an item is placed.

BACKGROUND OF THE INVENTION

Trivets are well known household items used as stands, particularly for hot items. Generally, trivets are used to place hot items, such as plates, pots, etc., on tables, counters or other surfaces to keep the hot item from marking the surface.

Since the items to be supported are often of varying size, expanding trivets have been designed. These generally come in two varieties, pivoting and sliding. The first type is generally formed with two or more members connected by one or more pivots that, upon rotation about the pivot(s), the members can be oriented to form larger or smaller sizes. Examples of expandable trivets utilizing such pivotable connections are found in U.S. Pat. Nos. 3,967,803 and 4,725,028 and U.S. Patent Application Publication No. 2007/0034755.

Expandable trivets that use the sliding mechanism usually employ rods between two or more members, where the members are slid on the rods to move away from one another. Examples of expandable trivets formed with rods on which the members slide are found in U.S. Pat. Nos. D388,278 and 6,000,666.

Additionally, there have been changes in the materials used for trivets over the years. Traditionally, trivets made from natural materials such as metal, ceramic, wood and stone trivets were widely used. More recently, upon the advent of high temperature plastics and elastomers, including silicone, trivets have been made from man-made materials. However, expandable trivets have only been formed of multiple parts that move in relation to one another, which increase the cost and complexity of manufacture.

Therefore, an expandable trivet that does not require multiple parts would advance the art.

SUMMARY OF THE INVENTION

The present invention is directed to a trivet having three or more lobes connected serially to one another by elastomeric connectors, such that each lobe is coupled to an adjacent lobe on each side to form a continuous loop of the three or more lobes, where the trivet can be converted from a closed configuration with the lobes directed inwardly to an open configuration, with the lobes directed outwardly, by rotating the lobes 180° on the connectors.

The trivet of the present invention therefore permits the user to determine the size of the trivet depending on the application, where the trivet in its closed configuration is suitable for holding smaller items and the trivet in its open configuration is suitable for holding larger items.

Additionally, the trivet may be formed in any of a variety of shapes when in its closed configuration. Although the trivet shown is formed in a circular shape, it is contemplated that the trivet can be formed in a substantially square or other predetermined shape as may be desired.

In its preferred embodiment, the lobes and connectors are unitarily formed of a flexible elastomeric material, and most preferably silicone, by injection molding or other means. Using the preferred material, there is no need for any mechanical pivots, the material of the connectors being able to flex from an outwardly arced connection when the trivet is in its closed configuration to an inwardly arced connection when the trivet is in its open configuration.

The dimensions of the trivet can otherwise be determined by the user. For example, it is contemplated that the thickness of the trivet be from about ⅛ to about ¾ of an inch, with from about ¼ to about ⅜ being preferred, and from about 5 to about 9 inches in diameter in the closed configuration, with from about 6 to about 8 inches being preferred. However, any suitable dimensions are contemplated herein.

The connectors can be any cross-sectional shape, including but not limited to circles, ovals, squares, rectangles, parallelograms, rhombuses, etc., but it has been found that a rectangle having a height greater than the width is preferred. For such a rectangular a height to width ratio of between about 1.1 to 1 and about 2.5 to 1 is preferred with between about 1.25 to 1 and about 1.75 to 1 being more preferred and about 1.5 to 1 being most preferred. In his regard, connectors with a height of from about ⅛ to about ¾ of an inch and widths of from about ³⁄₃₂ to about ⅝ of an inch are preferred, with a height of about ⅜ and a width of about ¼ being more preferred.

The lobes themselves can be any shape, as long as they fit within the perimeter formed by the lobes and connectors in a single plane when in the closed configuration. It has been found that it is preferred that the lobes have a generally triangular shape, with the bottom formed adjacent the connectors and sides converging to a point, and preferably a rounded "point," toward the middle of the trivet in the closed configuration.

Preferably, the lobes are of uniform size and shape, the size and shape determined by the number of lobes used to form the trivet. Notwithstanding, non-uniform lobes can be used as desired for aesthetics or functionality.

In a preferred embodiment, the interior portions of the lobes have a web or pattern of indentations or holes. This pattern of indentations or holes acts not only to dissipate heat, but to reduce the costs of manufacture. When using indentations, it is preferred that the indentations are found on both sides of the lobes, although indentations on only one side may be used.

BRIEF DESCRIPTION OF THE DRAWINGS

The attached drawings are intended to better illustrate a preferred embodiment of the present invention without limiting the invention in any manner whatsoever.

DETAILED DESCRIPTION OF THE PREFERRED EMBODIMENT

The following description of the preferred embodiment is presented to describe the present invention without limiting the scope of the appended claims in any manner whatsoever.

Figure 1:
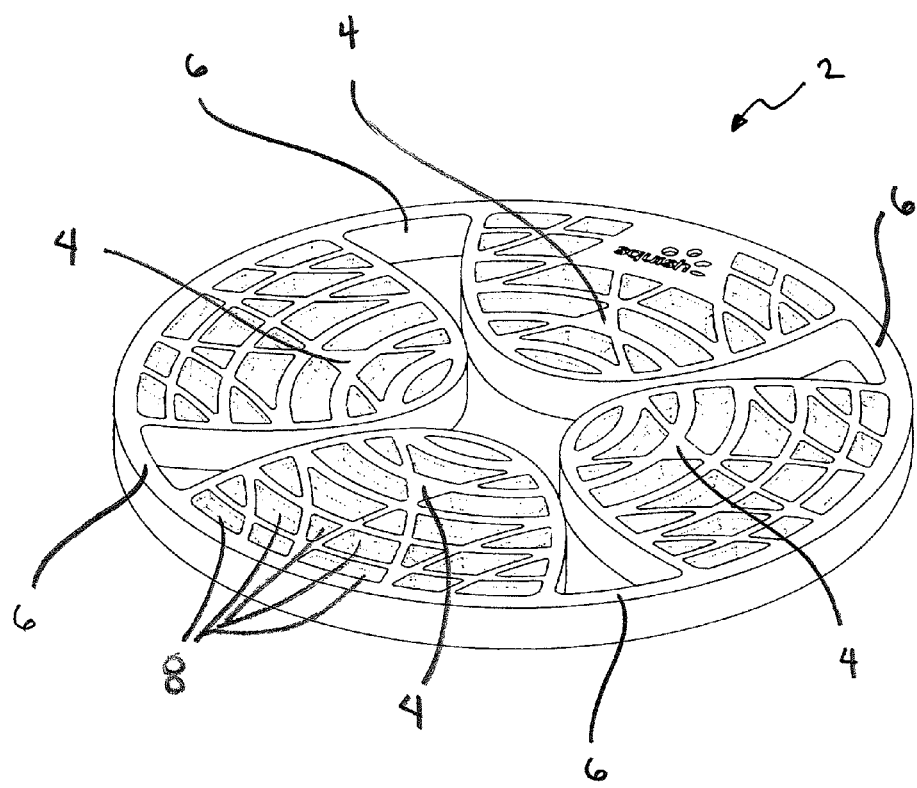
FIG. 1 is a perspective view of a trivet according to the teachings of the present invention in its closed configuration.
Figure 2:
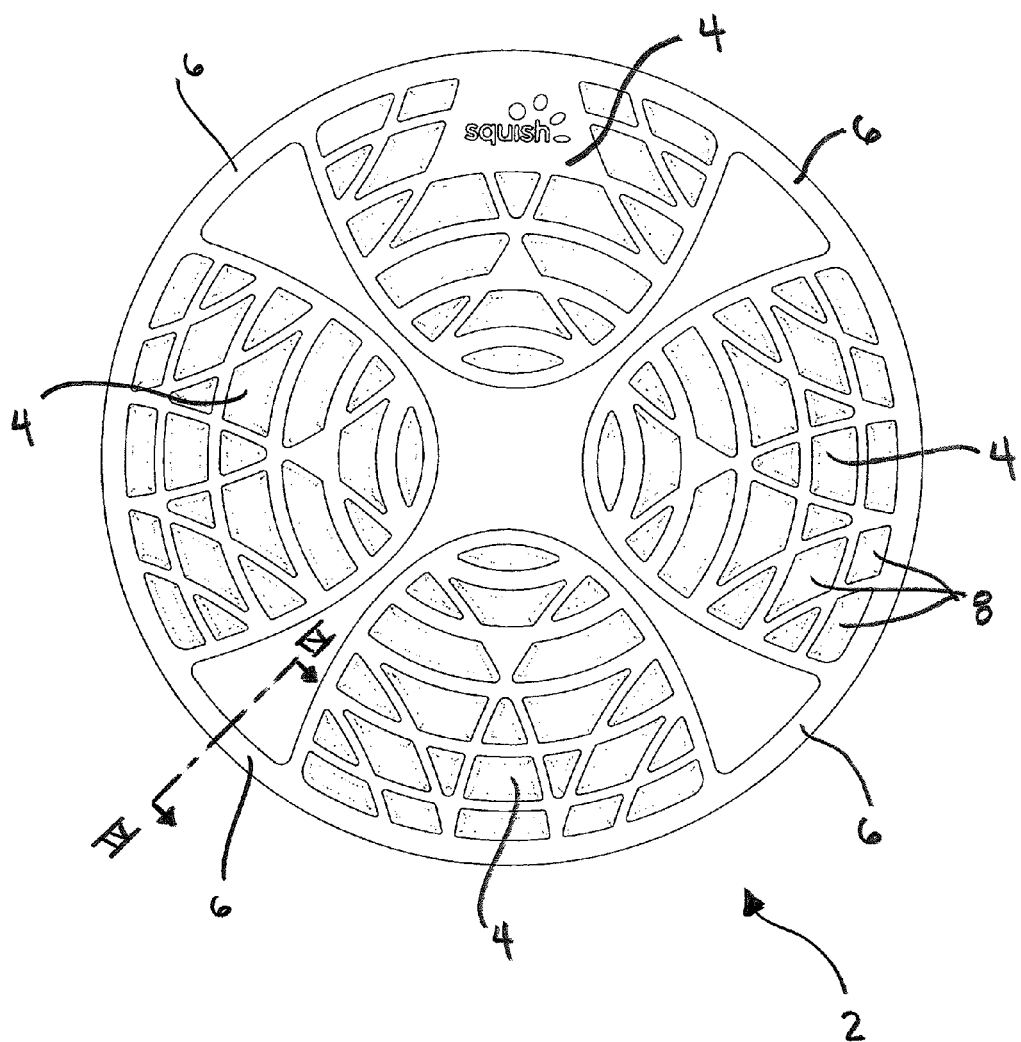
FIG. 2 is a plan view of the trivet of FIG. 1 in its closed configuration.
Figure 5:
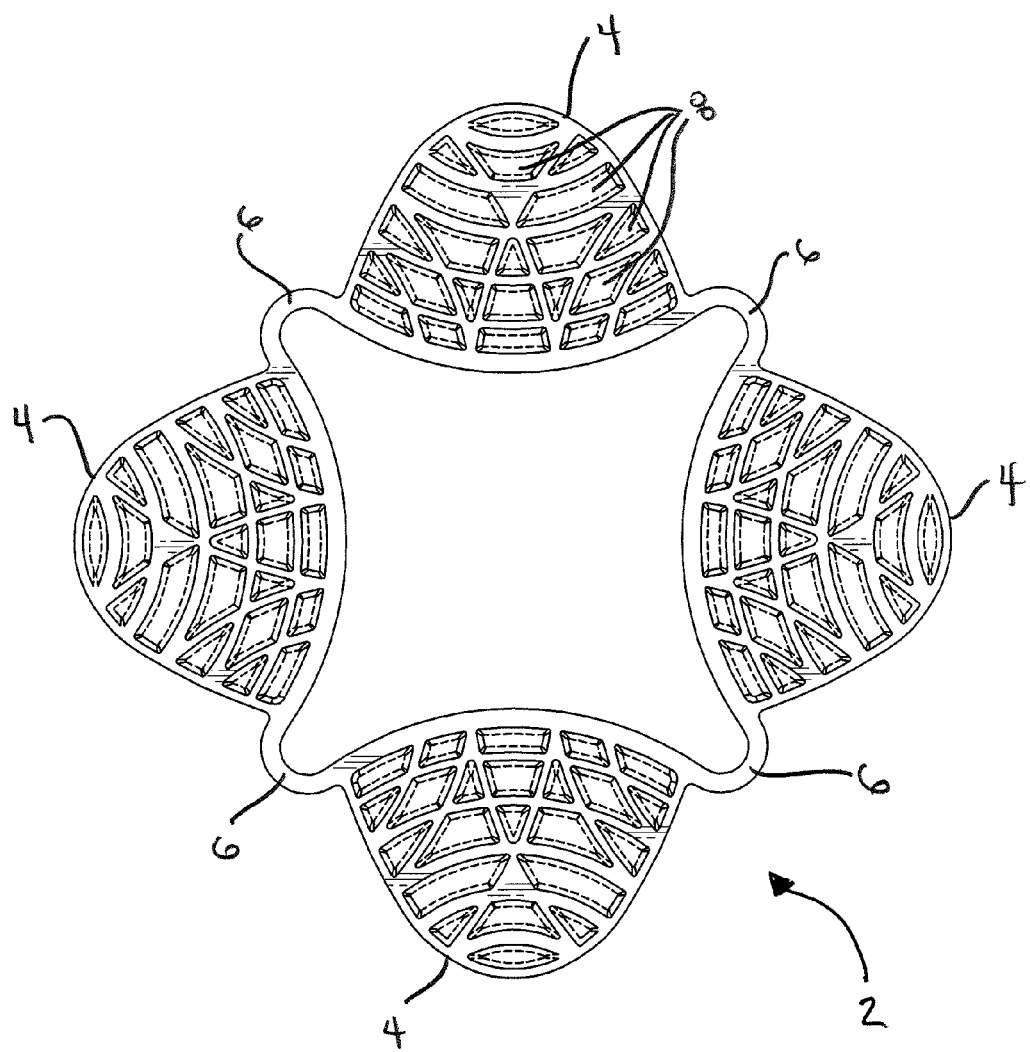
FIG. 5 is a plan view of the trivet of FIG. 1 in its open configuration.

As shown in the Figures, and particularly FIGS. 1, 2 and 5, the present invention is directed to a trivet 2 comprising three or more lobes 4 connected serially to one another by elastomeric connectors 6, with each lobe 4 coupled to an adjacent lobe 4 on each side to form a continuous loop of the three or more lobes 4, wherein the trivet 2 can be converted from a closed configuration with the lobes 4 directed inwardly to an open configuration, with the lobes 4 directed outwardly, by rotating the lobes 4 180° on the connectors 6.

In preferred embodiment shown, the lobes 4 and connectors 6 are unitarily formed of a silicone to permit the lobes 4 to be rotated 180° from the closed configuration shown in FIGS. 1 and 2 to the open configuration shown in FIG. 5 without the need for any mechanical pivots. In this regard, the material forming the connectors 6 between the lobes 4 are flexed from an outward arc (see FIG. 2) when the trivet 2 is in its closed configuration to an inward arc (see FIG. 5) when the trivet 2 is in its open configuration.

Figure 4:
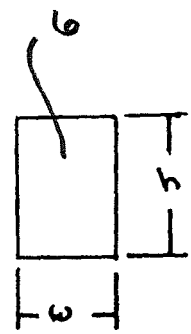
FIG. 4 is a cross-sectional view of a connector of the trivet of FIG. 1 through line IV-IV of FIG. 2.

The connectors 6 are preferably formed of a cross-sectional shape that has a height dimension "h" which is greater than the width dimension "w," and is most preferably a rectangle as shown in FIG. 4. It has been found that connectors 6 having a height to width ratio of between about 1.1 to 1 and 2.5 to 1 is preferred, with a ratio between about 1.25 to 1.75 to 1 being more preferred and a ratio of 1.5 to 1 being most preferred.

Similarly, the preferred trivet 2 in its circular shape is preferably about 7½ inches in diameter and about ⅜ of an inch thick. The connectors 6 of the preferred trivet shown are about ⅜ of an inch in height and about ¼ of an inch in width.

Figure 3:
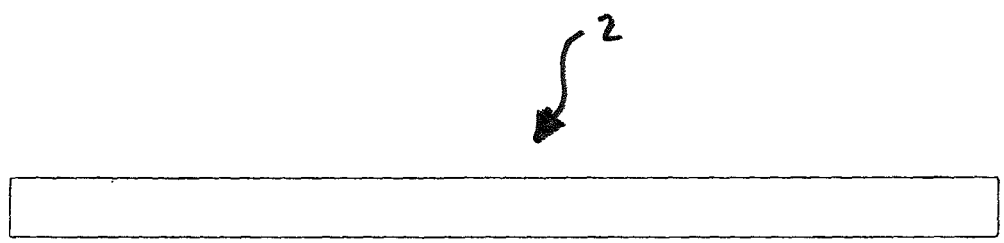
FIG. 3 is a side view of the trivet of FIG. 1 in its closed configuration.

The lobes 4 themselves can be any shape, as long as they fit within the perimeter formed by the lobes 4 and connectors 6 in a single plane when in the closed configuration (see FIG. 3). It has been found that the preferred lobes 4 have a generally triangular shape, with the bottom formed adjacent the connectors 6 and sides converging to a point, and preferably a rounded "point," toward the middle of the trivet 2 in the closed configuration.

Preferably, the lobes 4 are of uniform size and shape, the size and shape determined by the number of lobes 4 used to form the trivet 2. Notwithstanding, non-uniform lobes 4 can be used as desired for aesthetics or functionality.

In a preferred embodiment shown, the interior portions of the lobes 4 have a web or pattern of indentations 8 or holes. This web of indentations 8 or holes acts not only to dissipate heat, but to reduce the costs of manufacture. When using indentations 8, it is preferred that the indentations 8 are found on both sides of the lobes 4, although indentations 8 on only one side may be used.

Variations, modifications and alterations to the above detailed description will be apparent to those skilled in the art. All such variations, modifications and/or alternatives are intended to fall within the scope of the present invention, limited only by the appended claims. All cited patents and publications are hereby incorporated by reference.

The invention claimed is:

1. A trivet having three or more lobes connected serially to one another by connectors, such that each lobe is coupled to an adjacent lobe on each side to form a continuous loop of the three or more lobes, where the trivet can be converted from a closed configuration, with the lobes directed inwardly, to an open configuration, with the lobes directed outwardly, by rotating the lobes and the connectors 180°, said lobes and connectors being unitarily formed of an elastomeric material.

2. The trivet of claim 1 wherein the elastomeric material is a silicone.

3. The trivet of claim 1 having 4 lobes.

4. The trivet of claim 1 wherein the lobes have a generally triangular shape.

5. The trivet of claim 1 wherein the trivet is formed in a circular shape when in the closed configuration.

6. The trivet of claim 1 wherein the connectors have a height dimension and a width dimension where the height is greater than the width.

7. The trivet of claim 6 wherein the connectors have a height to width ratio of between about 1.1 to 1 and 2.5 to 1.

8. The trivet of claim 6 wherein the connectors have a height to width ratio of between about 1.25:1 to 1.75:1.

9. The trivet of claim 6 wherein the connectors have a height to width ratio of about 1.5:1.

10. The trivet of claim 1 wherein the connectors are substantially rectangular in shape, with the height being greater than the width.

11. The trivet of claim 1 wherein at least one of the lobes has a pattern of indentations on at least one side.

12. The trivet of claim 11 wherein the at least one lobe has a pattern of indentations on a top side and on a bottom side.

13. The trivet of claim 1 wherein at least one of the lobes have a pattern of holes through the lobe.

* * * * *